W. R. Blanchard,
Cultivator.
No. 86,205. Patented Jan. 26, 1869.

Witnesses
M. Vorlaender
Wm A Morgan

Inventor
Wm R Blanchard
per Munn & Co
Attorneys

United States Patent Office.

WILLIAM R. BLANCHARD, OF HERTFORD, NORTH CAROLINA.

Letters Patent No. 86,205, dated January 26, 1869.

IMPROVEMENT IN CULTIVATORS.

The Schedule referred to in these Letters Patent and making part of the same.

*To all whom it may concern:*

Be it known that I, WILLIAM R. BLANCHARD, of Hertford, in the county of Perquimans, and State of North Carolina, have invented a new and improved Cultivator; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved implement for cultivating corn, and other crops planted in rows, and which shall be so constructed as to be easily and quickly adjusted for the different purposes for which it may be used, and so as to do its work well; and It consists in the construction and combination of the various parts, as hereinafter more fully described.

A are the plow-beams, to the rear parts of which are attached the standards B and handles C.

Figure 1:
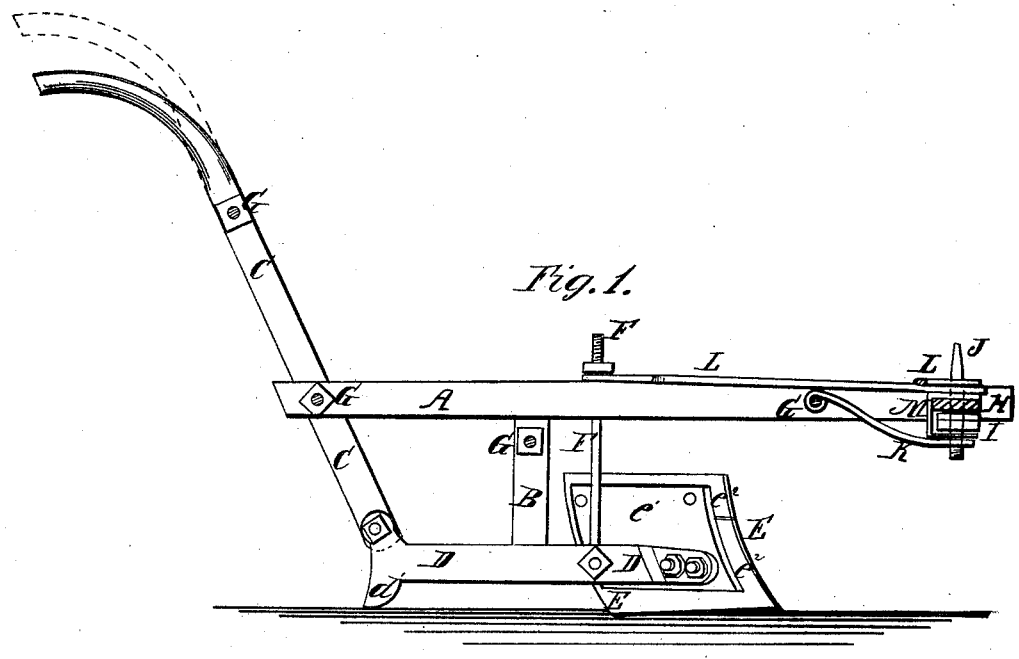
Figure 1 is a vertical longitudinal section of my improved cultivator, taken through the line x x, fig. 2.

To the lower ends of the handles C and standards B are attached the horizontal bars D, having downwardly-projecting heels or guides, $d'$, attached to or formed upon the rear ends of their lower edges, as shown in fig. 1.

The forward ends of the bars D are bent inward, at the angle at which it is desired to have the scrapers stand, said bent or inclined ends having holes formed through them to receive the bolts, by which the scrapers E are secured to said bars.

The bars D are still further secured in place, and strengthened by the rods F, the lower ends of which are securely bolted to the forward parts of the said bars D, and the upper ends of which pass through the beams A, to which they are secured by nuts.

The scrapers E consist of a wooden plate, $e^1$, made in the desired form, and the lower part of the forward side of which is faced with a steel plate, $e^2$, while its upper part is faced with sheet-iron, $e^3$.

The scrapers E are secured to the inclined ends of the bars D by bolts and nuts, and are so arranged that their points or forward ends may be raised a little, so that their lower edges may incline downward from point to heel, as shown in fig. 1.

Each beam, handle, and scraper thus form an independent single scraper, and may be used alone if desired.

Figure 2:
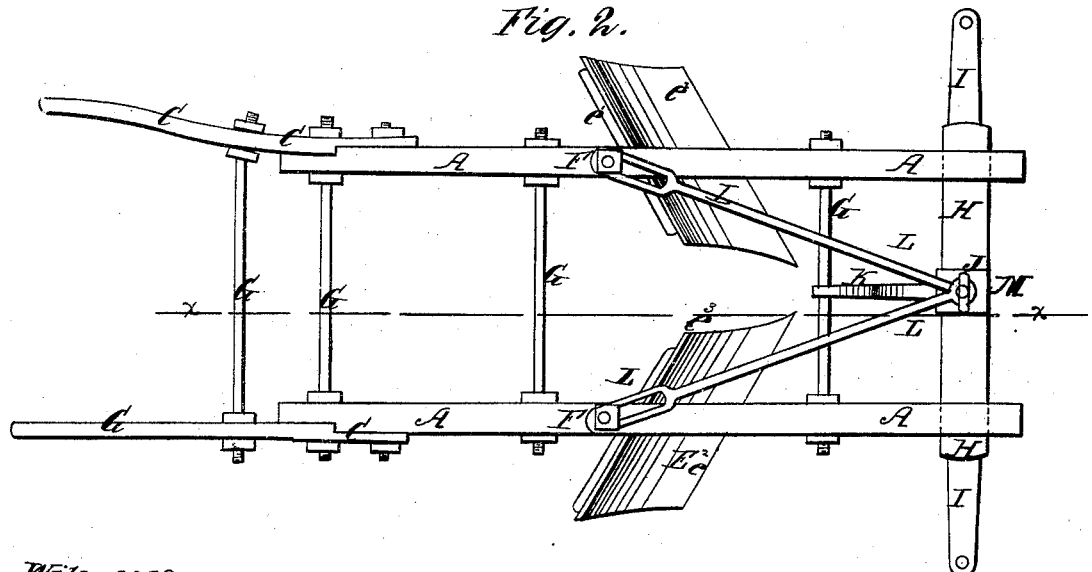
Figure 2 is a top or plan view of the same.

The beams A, handles C, and standards B, are adjustably connected together by the rods G, to one end of which rods one of the said beams, handles, and standards are secured, by a stationary collar formed upon the said rods, and resting against the inner sides of the said beam, handle, and standard, and by nuts screwing upon the ends of said rods, upon the outer side of said beam, handle, and standard, as shown in fig. 2.

The other beam, handle, and standard are secured in place upon the other ends of the rods G, by nuts placed upon the said rods, upon each side of the said beam, standard, and handle, as shown in fig. 2, so that the said beams, standards, and handles may be readily adjusted closer together or further apart, by simply moving the said nuts.

H is a horizontal cross-bar, the ends of which pass through mortises in the ends of the beams A, so that the said beams may slide upon the said bar, as they are moved in or out in adjusting them.

I is the swingle-tree, which is pivoted to the bar H by the bolt J, which passes down through the centre of the said bar and said swingle-tree, as shown in the drawings, and is further secured in place by the clevis or strap M, as shown in fig. 1.

The lower end of the bolt J is supported against the draught-strain by the brace-bar K, through the forward end of which the said bolt passes, and through an eye or hook, formed upon the rear end of which, the forward connecting-rod G passes.

The upper end of the bolt J is supported against the draught-strain by the brace-rods L, through the forward ends of which the said bolt passes, and through slots in the rear ends of which the upper ends of the rods F pass, so that the rear ends of the said brace-rods may be secured by the same nuts by which the beams A are secured to the said rods F, as shown in figs. 1 and 2.

The rear ends of the rods L are slotted, to enable their lengths to be easily adjusted to the different positions of the beams A, as they are moved towards or from each other.

It will be observed that the left-hand handle is made shorter or lower than the other, and is bent or inclined to the left, to enable the operator, when weeding the crop, to conveniently hold the cultivator while walking at the side of the row of plants.

It will also be observed that, when weeding the crop, the weeds and dirt are thrown from the plants, the forward ends or points being adjusted to run nearer to or farther from the plants, as may be desired.

It will be also observed that when it is desired to throw the soil towards or around the stalks of the plants, the beams A, handles C, and standards B may be moved towards each other, until the inner or forward ends of the scrapers may meet, so that, as the cultivator is drawn between two rows, it may throw the soil around the stalks of both of said rows.

I claim as new, and desire to secure by Letters Patent—

1. The combination of the draught-bar H, bolt J, brace-rod K, and slotted brace-rods L, with the beams A, and rods F, substantially as herein shown and described, and for the purpose set forth.

2. An improved cultivator, formed by the combination of the beams A, standards B, handles C, horizontal bars D, adjusting connecting-rods G, scrapers E, rods F, draught-bar H, bolt J, brace rod K, and slotted brace-rods L, with each other, substantially as herein shown and described, and for the purposes set forth.

The above specification of my invention signed by me, this 12th day of September, 1868.

WILLIAM R. BLANCHARD.

Witnesses:
TIMOTHY MORGAN,
JAMES C. SKINNER.